United States Patent
Collovati (12)

(10) Patent No.: US 6,382,115 B1
(45) Date of Patent: May 7, 2002

(54) PLOWSHARE PARTICULARLY FOR SEEDING AND EVENTUAL MANURING IN SOIL ON CONTINUOUS LINE

(76) Inventor: Mauro Collovati, Via Marconi, 4, I-33050 Teor (IT)

( * ) Notice: Subject to any disclaimer, the term of this patent is extended or adjusted under 35 U.S.C. 154(b) by 0 days.

(21) Appl. No.: 09/601,703

(22) PCT Filed: Feb. 19, 1999

(86) PCT No.: PCT/IT99/00039

§ 371 Date: Aug. 4, 2000

§ 102(e) Date: Aug. 4, 2000

(87) PCT Pub. No.: WO99/43197

PCT Pub. Date: Sep. 2, 1999

(30) Foreign Application Priority Data

Feb. 26, 1998 (IT) .......................................... UD98A0028

(51) Int. Cl.[7] .................................................. A01C 5/00
(52) U.S. Cl. ........................ 111/152; 172/730; 172/765; 172/196
(58) Field of Search ................................ 172/722, 724, 172/730, 733, 721, 725, 700, 193, 760, 765, 766, 769, 770, 771, 754, 195, 196; 111/152, 149, 190, 18, 81

(56) References Cited

U.S. PATENT DOCUMENTS

| | | | | |
|---|---|---|---|---|
| 422,718 A | * | 3/1890 | Cameron | |
| 609,602 A | * | 8/1898 | Wood | |
| 709,147 A | * | 9/1902 | Fay | |
| 1,381,028 A | * | 6/1921 | Stevenson | |
| 1,648,843 A | * | 11/1927 | Francis | |
| 2,558,154 A | * | 6/1951 | Porter | |
| 2,889,788 A | * | 6/1959 | Van Dorn | |
| 3,152,649 A | * | 10/1964 | Arnold | |
| 4,047,577 A | * | 9/1977 | Tibbs, II | |
| 4,141,301 A | * | 2/1979 | Coldren | |
| 4,583,599 A | * | 4/1986 | Anderson | |
| 4,770,112 A | * | 9/1988 | Neumeyer | |
| 4,825,782 A | * | 5/1989 | Mikkelsen | |
| 5,005,497 A | * | 4/1991 | Kolskog | |
| 5,136,954 A | * | 8/1992 | Fetaz et al. | |
| 5,398,700 A | * | 3/1995 | Harden | |
| 5,495,814 A | * | 3/1996 | Primus | |
| 5,520,125 A | * | 5/1996 | Thompson et al. | |
| 5,531,277 A | * | 7/1996 | Noonan et al. | |

FOREIGN PATENT DOCUMENTS

| | | | | |
|---|---|---|---|---|
| DE | 933537 | * | 9/1955 | .................. 172/730 |
| SU | 136106 | * | 5/1960 | .................. 172/730 |

OTHER PUBLICATIONS

Add–On Wings For Chisel Plow Sweeps, Farm Show vol. 9, No. 3, May 13, 1985, p. 27.*

* cited by examiner

Primary Examiner—Victor Batson
(74) Attorney, Agent, or Firm—Harrison & Egbert

(57) ABSTRACT

Plowshare particularly for seeding and eventual manuring in soil in a continuous line of the type involving two equal and symmetrical opposite convergent wings with an apex having a substantial "V" shaped plan (31). Their ends are turned upwards (32) so that the plowshare may be pulled so as to penetrate at a certain depth into the soil; cut the soil at the depth and make it slide above the wings (31). The flaps (32) force the soil to pour back in the obtained furrow covering it, applying at least one seed distribution device in the free area of the "V" shaped inside apex being possible.

2 Claims, 1 Drawing Sheet

PLOWSHARE PARTICULARLY FOR SEEDING AND EVENTUAL MANURING IN SOIL ON CONTINUOUS LINE

BACKGROUND OF THE INVENTION

1. Field of the Invention

The present invention relates to a plowshare particularly for seeding and eventual manuring in soil in a continuous line.

2. Description of Related Art

In prior art different types of plowshares and apparatuses for seeding and eventual manuring in soil in a continuous line are known.

Those type of plowshares consist of:

means for the opening of furrows in the soil;

means for laying the seed in said furrow;

means for closing the furrow over the seed; and eventual means for spreading the fertilizer along said furrow.

The present solutions adopt different devices, such as:

a plowshare for opening said furrow followed by the seed spreader and a tool for closing the furrow; and a spreading tool which also acts as a plowshare by directly penetrating into the soil.

Closest solutions to the present apparatus are disclosed in German Patent Application No. DE-816.771, that suggests the use of plowshare with two equal and symmetrical opposite convergent wings with an apex having a substantially "V" shaped plan, said wings being shaped like airplane wings having a "substantially V" shaped plan (b) and their ends are turned upwards in a helical shape (b1). In front of this plowshare is an upward cutter (d) followed by a swallow tail (a).

U.S. Pat. No. 5,531,277 discloses a bent wing sweep having a modified shape of the wing in respect to the above solution, not being provided with a separate heading soil cutter. U.S. Pat. No. 5,005,497 discloses a deep banding knife with rod attachment.

The prior art drawbacks substantially consist of that the seed taking root inconsistently.

In particular the first solution gives the best performances, nevertheless even this does not ensure the best taking root yield.

The reason for which all the existing solutions do not ensure a maximum taking root, substantially derives from that they are not able to ensure a suitable seed covering in the many operational conditions.

BRIEF SUMMARY OF THE INVENTION

A purpose of the present invention is that of obviating the aforementioned drawbacks and ensuring that the seed falls on the already tilled and thus suitably covered soft soil.

The problem is solved as claimed by a seeding apparatus with plowshares, respectively opening-plowshares and seeding-plowshare, particularly for seeding in soil in a continuous line, said seeding-plowshare being of the type involving two equal and symmetrical opposite convergent wings with an apex. having a substantially "V" shaped plan, wherein:

the frontal edge of said two wings lies on a substantially horizontal line, said wings being shaped like airplane wings having a "substantially V" shaped plan and;

their ends are turned upwards, in order to allow that:

said plowshare may be pulled so as to penetrate at a certain depth into the soil;

said plowshare cuts the soil at said depth and to make it slide above said wings and said flaps, force said soil to pour back in the obtained furrow covering it; wherein:

at least one seed distribution device in the free area of the "V" shaped inside apex is provided after the rear apex of said seeding-plowshare;

the rear edge of said wings is substantially higher than the front edge; and it includes before the front apex of each said plowshare at least an opening-plowshare for the furrow opening or soil breaking (1). substantially at a depth greater than the front edge of said seeding-plowshare.

Thus the advantage of sowing the seed in a tilled soil both over and under the seed with a more certain germination is obtained.

Advantageously the front edge of said wings (311) lays on a substantially horizontal line, so that a soil layer having a suitable thickness may be easily removed.

Advantageously, the rear edge of said wings is substantially. higher than the front edge, and is substantially horizontal or slightly tilted outwards and downwards. Thus a better efficacy in soil mixing and seed covering is obtained. Advantageously, said flaps tighten backwards tending to slightly heap the removed soil layer which falls back on the same furrow.

BRIEF DESCRIPTION OF THE SEVERAL VIEWS OF THE DRAWINGS

These and other advantages will result from the following description of an embodied preferred solution, with the aid of the enclosed drawings, whose execution details are not to be considered as restrictive but are only given as examples.

DETAILED DESCRIPTION OF THE INVENTION

Figure 1:
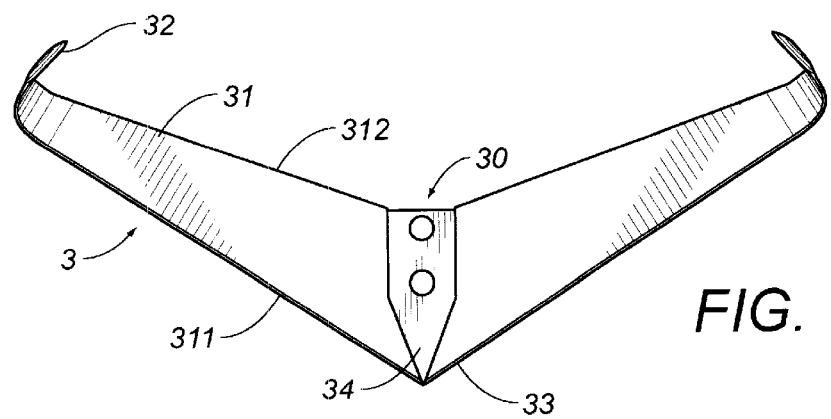
FIG. 1 is a plan view of the seeding plowshare.
Figure 2:
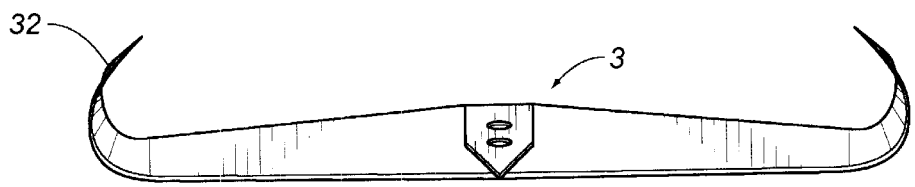
FIG. 2 is a front view of the same plowshare.
Figure 3:
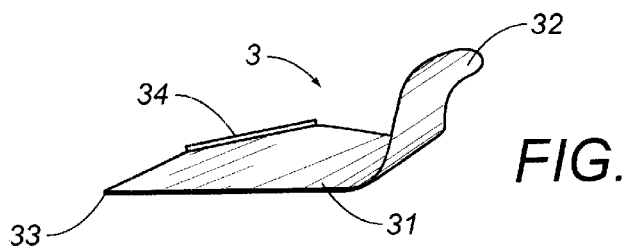
FIG. 3 is a side view of the same plowshare.
Figure 4:
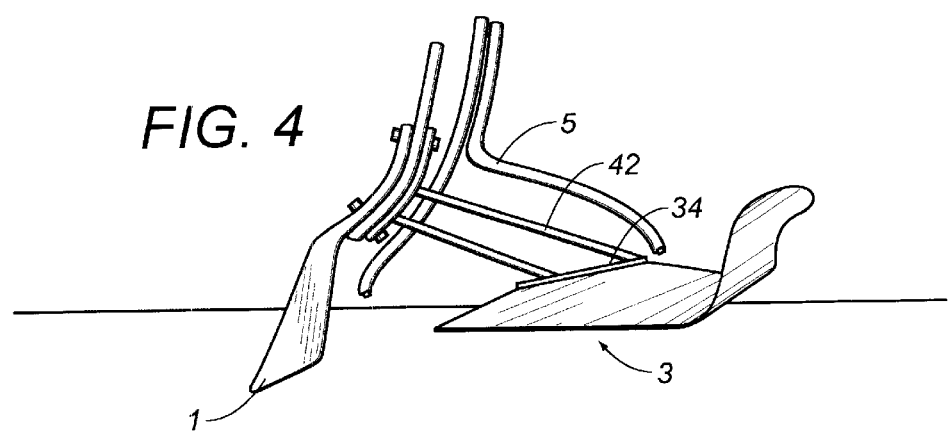
FIG. 4 is a view of the plowshare assembling system in the seeding apparatus.

According to the figures it may clearly be noticed that the innovation concerns a plowshare particularly for the seeding and eventual manuring in soil on continuous line, of the type involving two equal and symmetrical opposite convergent wings with an apex having a substantially "V" shaped plan, characterized in that said two wings are shaped like airplane wings having a "substantially V" shape top view (31) and; their ends are turned upwards to realize a couple of flaps (32), in order to allow that: said plowshare may be pulled penetrating at a certain depth into the soil; cutting the soil at said depth and making it slide above said wings (31) and said flaps (32), force said soil to pour back in the obtained furrow covering it; applying at least one seed distribution device in the free area of the "V" shaped inside apex being possible.

The front edge of said wings (311) lays on a substantially horizontal line The rear edge of said wings (312) is substantially higher than the front edge (311) and is substantially horizontal or slightly tilted outwards and downwards. Said flaps tighten backwards tending to slightly heap the removed soil layer which falls back on the same furrow. The seeding apparatus includes the plowshare (3) and within said plowshare internal rear apex (30) there is a seed spreader (5). Before the front apex of each said plowshare (33) there is a plowshare for the furrow opening or soil breaking (1), substantially at a depth greater than the front edge (33-311) of said seeding plowshare (3). Before the front apex of said plowshare (33) and after said opening plowshare (1) there is a seed or fertilizer spreader (5). Said seeding plowshare (3) is connected by means of arms (42) to its joining central part (34) in a dismountable way, to a support structure (4). to which also said front opening plowshare (1) is connected in a dismountable way.

Obviously said two plowshares: the opening or breaking one, and the seeding one (3) may be assembled all in one yet not changing the essence of the invention.

I claim:

1. A seeding apparatus for the seeding of soil along a continuous line comprising:

a seeding-plowshare means having two identical wings arranged on opposite sides of a central part, said wings being convergent so as to have a front apex with a substantially V-shape and a rear apex, said wings having a frontal edge extending along a substantially horizontal line, said wings having a V-shape in a plan view thereof, said wings having a pair of flaps turned upwardly at respective opposite ends thereof, said seeding-plowshare means for being pulled so as to penetrate to a desired depth in the soil such that the soil slides along a top surface of said wings and is poured backwardly by said pair of flaps;

a seed distribution means connected to said seeding-plowshare means adjacent said rear apex of said wings, said wings having a rearward edge elevated higher than said frontal edge; and an opening-plowshare means connected to seeding-plowshare means for breaking the soil at a depth greater than the desired depth of said seeding-plowshare means, said opening-plowshare means having a bottom forward edge positioned lower than said frontal edge of said seeding-plowshare means.

2. The seeding apparatus of claim 1, further comprising:

a support structure demountably connected by arms to said central part of said seeding-plowshare means, said opening-plowshare demountably connected to said support structure.

* * * * *